Patented Aug. 12, 1947

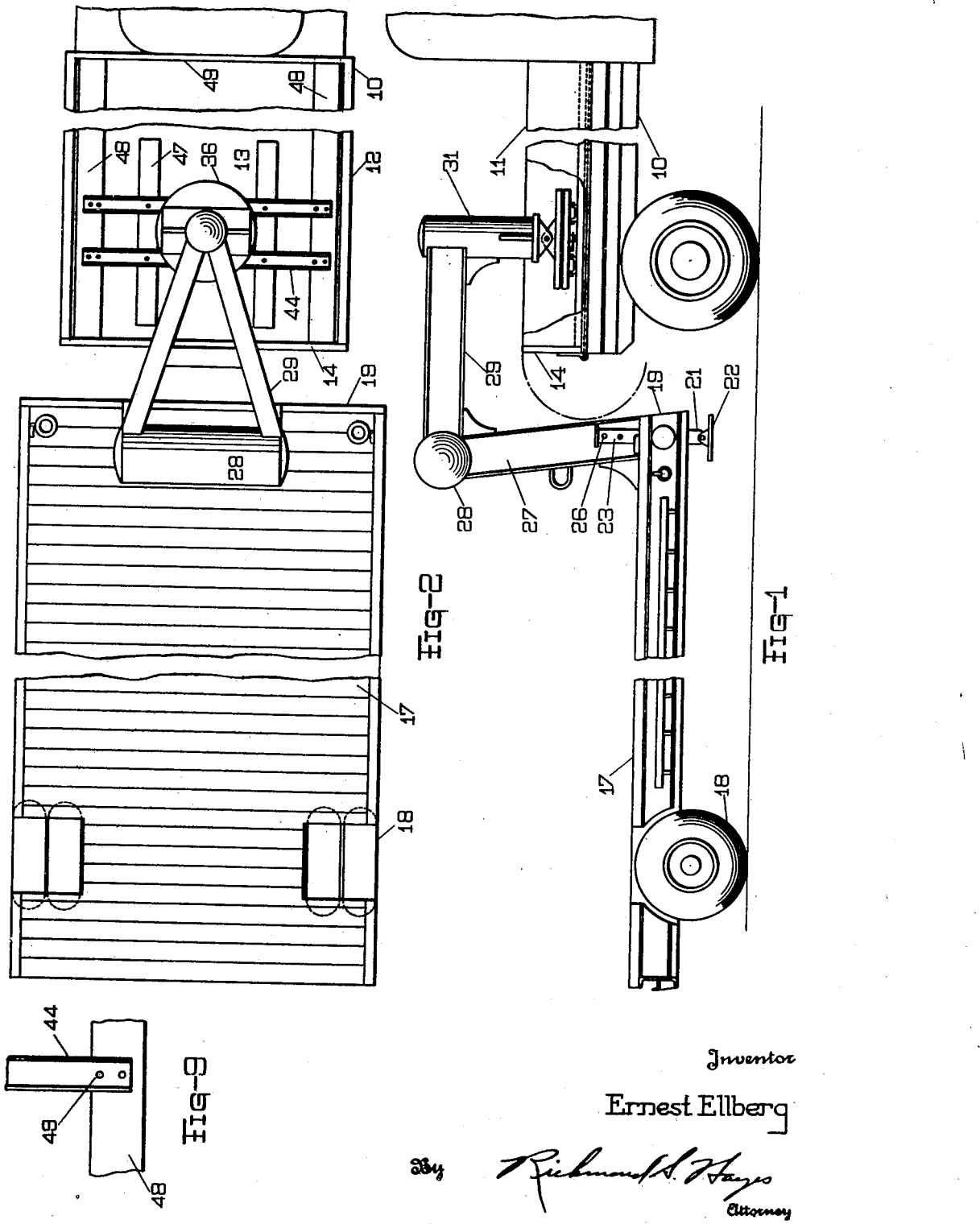

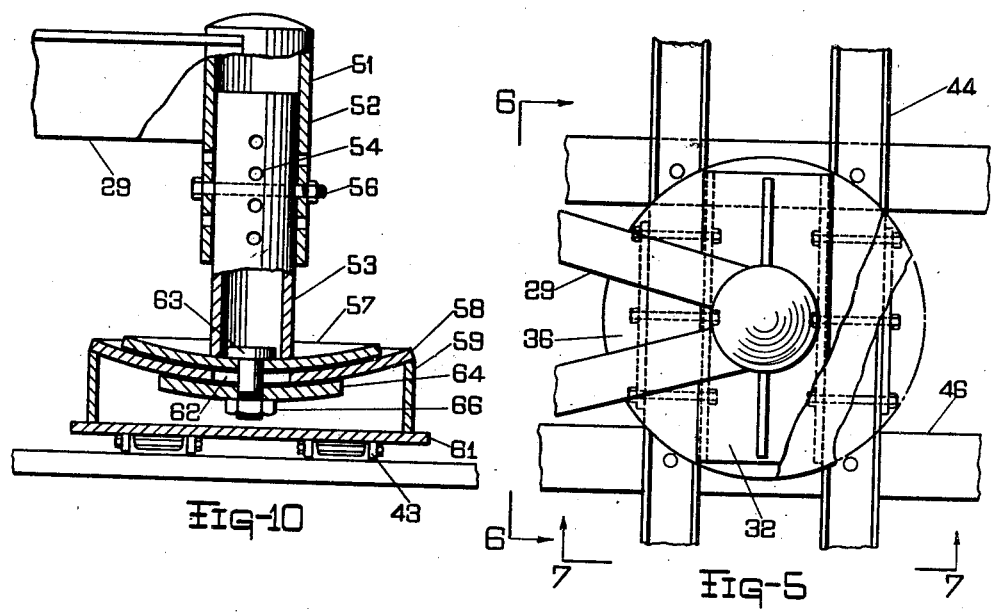
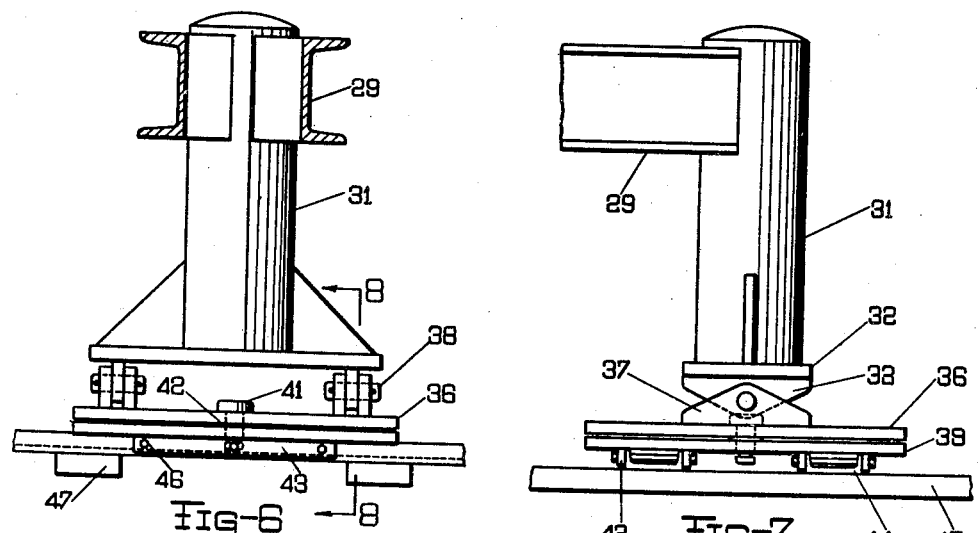
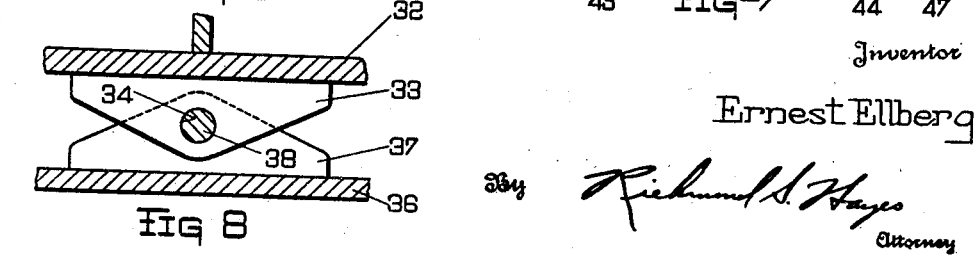

2,425,521

UNITED STATES PATENT OFFICE 2,425,521

TRAILER COUPLING

Ernest Ellberg, Warren, Pa., assignor to Benjamin F. Mead, Warren, Pa.

Application March 26, 1946, Serial No. 657,233

8 Claims. (Cl. 280—33.1)

This invention relates to load carrying vehicles of the type adapted to sustain heavy loads, and is more particularly concerned with and directed to the provision of means for coupling two such vehicles together. In its illustrated form the invention provides means for coupling a heavy duty semi-trailer to a powered load carrying vehicle.

It is well known that in order to perform large scale or extensive excavation work it is necessary to transport to the place of operations at least one piece of heavy excavating or material moving equipment. Also, one or more material carrying vehicles must be provided at the place of operations in order to transport the material from the excavation. To carry out work of this nature, a contractor has heretofore been required to provide himself with a powered vehicle having a so-called "fifth wheel" to which he could attach a semi-trailer capable of hauling an excavating machine such as a power scoop or shovel. In addition to this equipment, one or more dump trucks were provided in order to remove material from the place of excavation. During use of the excavating equipment and dump trucks, the trailer and its towing vehicle remained idle, served no useful purpose and constituted merely a costly and unremunerative part of the entire equipment.

The present invention endeavors to and has for an object the elimination of at least a part of the equipment formerly required by an excavating or material moving contractor. Elimination of some of this equipment is made possible through the provision of a semi-trailer, capable of carrying almost any size excavating machine, having means for coupling to one of the vehicles required in the actual excavation and transportation work.

It is another important object of the invention to couple, for hauling, a heavy duty semi-trailer to a powered vehicle by such means as to eliminate the need of any permanent coupling equipment on said vehicle.

Another object of the invention lies in the provision of means for coupling a semi-trailer to a conventional dump truck.

A further object of the invention lies in the provision of a semi-trailer having a combined pivot and swivel unit mounted on a draw-bar of such construction as to locate said unit within the conventional load receiving portion of a truck.

Additionally, it is an object of the invention to provide means for preventing a semi-trailer, having a combined pivot and swivel unit of the type herein described, from becoming displaced when located in the load receiving portion of a conventional truck.

It is also an object of the invention to provide means by which a semi-trailer may be coupled and uncoupled with respect to a conventional dump truck, regardless of any load on the trailer and without the aid of equipment other than the usual adjustable ground engaging supports carried at the forward end of the trailer.

Other objects and advantages will be more fully understood and appreciated from a consideration of the following specification, taken in conjunction with the accompanying drawings; and in which Fig. 1 is a side elevational view of a joined semi-trailer and truck provided with a coupling unit embodying one form of the invention;

Fig. 2 is a top plan view of the structure shown in Fig. 1;

Fig. 5 is an enlarged top plan view of the coupling unit;

Fig. 6 is an elevational view of the unit, taken in the direction indicated by line 6—6 of Fig. 5;

Fig. 7 is a further elevational view of the unit, being taken substantially as indicated by the line 7—7 of Fig. 5;

Fig. 8 is an enlarged fragmentary vertical sectional view taken as indicated by the line 8—8 of Fig. 6;

Fig. 9 is an enlarged detail of a part of the supporting mat of the unit; and

Fig. 10 is a vertical sectional view of a modification of the coupling unit, being shown in the same position as the unit in Fig. 7.

Figure 4:
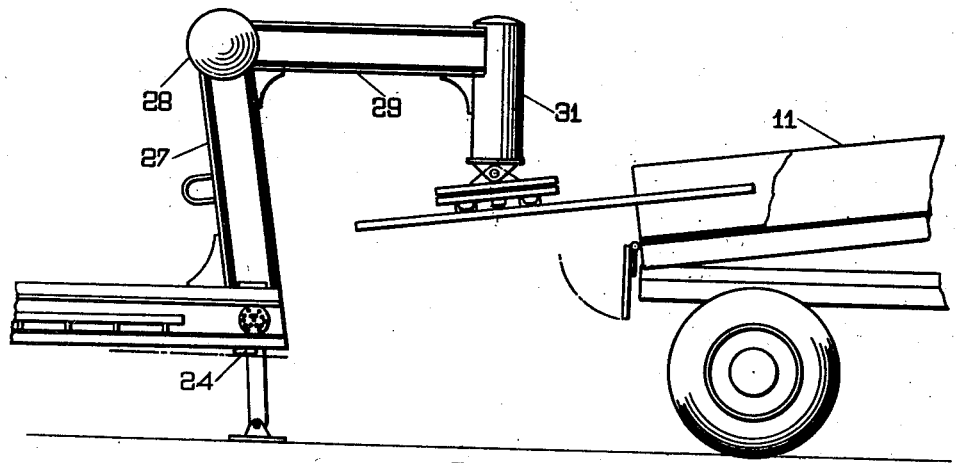
Fig. 4 is a similar fragmentary side elevational view showing the trailer and truck fully separated and the trailer self-supported.
Figure 3:
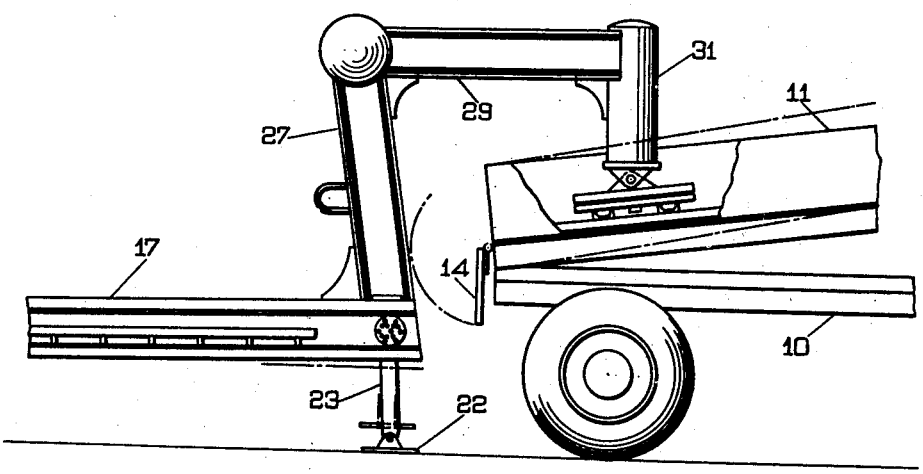
Fig. 3 is a fragmentary side elevational view showing the relationship of trailer and truck during the operation of disconnecting the truck from the trailer.

Referring more particularly to the drawings, the reference numeral 10 is employed to generally designate a truck. To illustrate one application of use of the invention, the truck 10 is shown to include a dirt or other material receiving box or body 11, which, through conventional mechanism, is capable of being elevated in the manner suggested in Fig. 3 for the purpose of displacing the box contents. The side walls 12, bottom 13, and hinged tail-gate 14 are all common structure in trucks of this type; in fact, the truck illustrated constitutes no part of the invention. A trailer 16 is shown to be of the heavy load carrying type and includes the usual platform 17, located as near to the ground as possible to facilitate loading and unloading large and heavy pieces of equipment. Towards the rear of the trailer, sets of dual wheels 18 are shown. The forward end of the trailer 19 is provided with a pair of adjustable legs 21. These legs may have self-levelling feet 22, and in their present form include tubular members 23 extending upwardly through the trailer body substantially as shown. They are adapted to be secured in any desired extended position through the provision of pins 24 projecting through selected apertures 26. The pins are located above the trailer body when it is desired to maintain the legs in a raised position (Fig. 1), and beneath the trailer body when the legs serve to sustain the weight of the forward end of the trailer (Fig. 4).

The trailer 16 is adapted to be coupled to the powered towing vehicle by means of a draw bar which, for purposes of the invention, is of goose neck type. This coupling is located at the forward end 19 of the trailer and includes spaced uprights 27. These uprights are so designed as to be incapable of any bending or twisting with respect to the trailer. The uprights 27 are connected at their upper ends by a cross-bar 28. Joined to the bar 28, at its point of jointure with the uprights, is a pair of converging beams 29. At substantially the point of meeting of these beams, they are rigidly joined to the upper end of a vertically disposed post 31. It will be understood that the uprights 27, beams 29, and post 31 are of such structure as to be capable of standing any load stress to which the trailer may be subjected in the course of its use.

Secured to the lower end of the post 31 is a transverse plate 32. This plate may be of the proportions shown and includes a pair of spaced, parallel, depending members 33. Each member is shown to be of somewhat triangular shape and formed with a transverse aperture 34 adjacent its widest point. A disk 36 is provided on its upper surface with pairs of upstanding, proximate members 37. The members of each pair are spaced to accommodate one of the members 33 of the plate 32 and may be generally of the same configuration in reversed position. The members 37 are formed with apertures which, when in register with the aperture 34, receive pivot pins 38. As may be seen from the structure thus far described, the disk 36 is so joined to the post 31 as to provide for relative tilting in a direction lengthwise of the trailer. Located directly beneath the disk 36 is a further disk 39. These disks are joined through the use of the centrally disposed bolt 41. As shown, it may be suitable, when joining these disks, to provide a spacing washer 42 for the purpose of reducing their frictional contact.

Attached to the under face of the disk 39 is a mat that serves not only to sustain the weight of the forward end of the trailer but to distribute this weight over a considerable area of the truck body on which it is adapted to rest. This mat, in the present illustration of the invention, comprises pairs of parallel spaced bars 43. Each pair of bars cooperates with the disk to provide a downwardly opening channel into which an upwardly opening channel 44 projects. The overlapping sides of these channels are provided with a number of registerable apertures through which bolts 46 project to removably secure the channels 44 to the disk 39. The channels 44, as shown in the drawings, are parallel and extend a considerable distance beyond diametrically opposite edges of the disk 39. Attached to the under surface of the base wall of both channels 44 is a pair of supporting bars 47. These bars are preferably disposed at right angles to the length of the channels and may be located in close proximity with the circumferential edge of the disk 39. As may be seen from the drawings, further supporting bars 48 are provided, being attached to the ends of the channels 44. In order that some adjustment in the spacing of bars 48 may be had, the ends of the channels 44 are provided with two or more openings which facilitate selective bolting of the bars 48 thereto. It will be understood that bars 47 and 48, being located beneath the channels 44, constitute, through swivel disks 36 and 39, a means of distributing the weight of the forward end of the trailer as applied through the post 31.

For a fuller understanding of the invention, a description of the assembly and disassembly of the structure herein described is set out, together with a further explanation of the advantages thereof. As already mentioned, the present invention proposes to eliminate part of an excavation contractor's previously required equipment by utilizing the powered vehicle, required during an excavating operation, as the powered vehicle for towing a trailer on which may be carried a heavy duty excavating machine. In most excavating projects, it is necessary to load the excavated material on dump trucks for transportation to a place of deposit or discard. The present disclosure of the invention, by way of illustration, presupposes that an excavating project is to be performed which necessitates transporting an excavating machine, and at least one dump truck, to the place of work. It may be assumed that the trailer 16 is self-supported, as suggested in Fig. 4 of the drawings, at the time the excavating machine is placed upon it. Following this, the dump truck 10 is attached to the trailer. This is accomplished by first lowering the tail-gate of the truck and slightly tilting the pivotal unit of the trailer carried by the post 31. The truck may now be backed into position before the trailer to bring the supporting bars into the truck box and in or near contact with the floor 13 thereof (see Fig. 3). If the floor of the truck box happens to be slightly beneath the supporting bars 47 and 48, the truck box may be tilted to the position shown in Fig. 3 wherein the bars contact the box floor. Further tilting of the box raises the forward end of the trailer and causes the truck to sustain this weight. The trailer supports 21 may now be adjusted to, and secured in, their raised position by the pins 24. Following this, the box of the truck is lowered to its normal position and the trailer and truck appear substantially as shown in Fig. 1. The tail-gate 14 is swung into closed position and the truck may now be operated to haul the trailer.

It is particularly pointed out that the supporting bars 48 are of a length to extend substantially from the forward end 49 of the box to the tail-gate 14, and that the bars are secured to the channels 44 in such spaced relationship that they will be in close proximity with the sides 12 of the box. Thus the supporting mat formed by the channels 44 and bars 47 and 48 cannot move about within the box of the truck. When the equipment has reached the place of work, the tail-gate 14 may be lowered and the box elevated to slightly tilt the trailer. The supports 21 are now lowered and secured and, upon lowering the truck box to its horizontal position, the truck may be driven from beneath the mounting unit. It may be readily understood from the foregoing that the trailer, during an excavating operation, is the only piece of unusable equipment, since the truck, following its uncoupling from the trailer, may be used in its normal capacity as a means of transporting material from one point to another.

Reference is now particularly directed to a modification of the pivotal and swivel portion of the coupling unit, substantially as shown in Fig. 10 of the drawing. Herein the beams 29 converge for attachment to a post 51 that partakes of the nature of a closed end sleeve 52. Projecting into the open end of sleeve 52 is a further sleeve or shaft 53. The interfitting portions of these sleeves are provided with one or more sets of registerable openings 54 through which a pin 56 may be projected to secure the sleeves in any desired extended position. The lower end of sleeve 53 is rigidly secured to the center of a concave disk 57. This disk is mounted on a larger diametered concave disk 58. Any suitable means, such as upright plates 59, may be secured to diametrically opposite edges of the disk 58 to support it on a further flat disk or plate 61. The under side of the plate 61 may be provided with bars 43 into which the channel members 44 of the supporting mat project in the manner and for the purpose of the previously described modification of the unit. It will be noted that the disk 58 has a large centered aperture 62 through which a bolt 63, permanently secured to the disk 57, may project. Beneath disk 58 is another disk 64, having an aperture of a size to accommodate the shaft of the bolt. Any suitable means, such as the nut 66 shown, will prevent disassembly of disks 57, 58, and 64. It is evident from the foregoing that the disk 58 is fixed with respect to the supporting mat and box of a truck, and that disks 57 and 64 may have universal sliding movement with respect thereto to an extent determined by the relative diameter of the bolt 63 and aperture 62. In this manner the coupling unit of the trailer is provided with a simple, easily assembled, universal connection with the supporting mat adapted to be located in the truck box. Furthermore, due to the fact that the post 51 is of adjustable length, the unit may be readily adapted to trucks having boxes of different heights.

Although applicant has shown and described only one application of use of the invention and two modifications of his pivotal structure, it will be understood that the invention, with only slight modification, is adaptable for use with other vehicles, and that such modifications are to be considered as being within the spirit and scope of the invention insofar as they are set out in the annexed claims.

Having thus set forth my invention, what I claim as new and for which I desire protection by Letters Patent is:

1. A coupling unit for joining a semi-trailer to a powered vehicle having a load receiving box, said unit comprising a draw bar rigidly attached to and extending forwardly of the end of said trailer, a mat adapted to rest on the bottom of the box of said vehicle, means pivotally connecting said mat to the free end of said draw bar, and means forming part of said mat so disposed as to be substantially co-extensive with the interior length and breadth of said box whereby to prevent both longitudinal and lateral displacement of said unit with respect to said vehicle.

2. A coupling unit for joining a semi-trailer to a powered vehicle having a load receiving box, said unit comprising a draw bar rigidly attached to and extending forwardly of the end of said trailer, a post depending from the free end of said draw bar, a mat adapted to rest on the bottom of said box, means pivotally connecting said mat to said post, a set of bars forming part of said mat, said bars being of a length and extending in a direction to be substantially co-extensive with the interior length of said box.

3. A coupling unit for joining a trailer to a powered vehicle having a load receiving box, said unit comprising a frame extending upwardly of and forwardly beyond the front of said trailer, a depending post joined to the free end of said frame, said post being of considerably lesser length than the height of said frame, a mat adapted to rest on the bottom wall of the box of said vehicle, means pivotally connecting said mat to the lower end of said post, a set of bars forming the under portion of said mat, said bars being so spaced as to be capable of contacting the side walls of said box and being substantially co-extensive with the interior length of said box.

4. In a goose neck type coupling unit for joining a trailer to a powered vehicle having a load receiving box, a pair of concentric relatively rotatable disks, means securing said disks for relative rotation, hinge means joining one of said disks to the free end of said unit, a mat joined to the under face of the other of said disks, and means forming part of said mat proportioned to be substantially coextensive with the interior width of said box and adapted to rest on the bottom wall thereof.

5. A coupling unit for joining a semi-trailer to a powered vehicle having a load receiving box, said unit comprising a draw bar rigidly attached to and extending forwardly of the end of said trailer, a post depending from the free end of said draw bar, a mat adapted to rest on the bottom of said box, means pivotally connecting said mat to said post, bars forming part of said mat, said bars being so disposed as to be substantially coextensive with the interior width of said box whereby to prevent lateral displacement of said unit.

6. A coupling unit for joining a semi-trailer to a powered vehicle having a load receiving box, said unit comprising a draw bar rigidly attached to and extending forwardly of the end of said trailer, a post depending from the free end of said draw bar, a mat adapted to rest on the bottom of said box, means pivotally connecting said mat to said post, and means forming part of said mat, said means being so disposed as to be substantially coextensive with the interior length of said box whereby to prevent longitudinal displacement of said unit.

7. The combination of a powered vehicle having a load receiving box and means operable to elevate said box with a coupling unit for a semi-trailer, said unit comprising a draw bar rigidly attached to and extending beyond the forward end of said trailer, a post depending from the free end of said bar, a mat in said box, means pivotally connecting said mat to said post, and means constituting part of said mat so disposed as to be substantially coextensive with the interior length and breadth of said box.

8. The combination of a powered vehicle having a load receiving box and means operable to elevate said box with a coupling unit for a semi-trailer, said unit comprising a draw bar rigidly attached to and extending beyond the forward end of said trailer, a post depending from the free end of said bar, a mat in said box, means pivotally connecting said mat to said post, and bars forming an under part of said mat, said bars being so disposed as to be capable of contacting the interior side and end walls of said box.

ERNEST ELLBERG.

REFERENCES CITED

The following references are of record in the file of this patent:

UNITED STATES PATENTS

| Number | Name | Date |
|---|---|---|
| 1,986,149 | Harris | Jan. 1, 1935 |
| 1,983,317 | Seitz | Dec. 4, 1934 |
| 1,941,323 | Robinson | Dec. 26, 1933 |
| 1,999,980 | Rogers et al. | Apr. 30, 1935 |
| 1,523,249 | Blum | Jan. 13, 1925 |
| 1,862,574 | Kuhlman | June 14, 1932 |